United States Patent
Gerbaulet et al.

(10) Patent No.: US 11,091,316 B2
(45) Date of Patent: Aug. 17, 2021

(54) CONTAINER FOR PRODUCING A BEVERAGE CAPSULE AND CAPSULE THEREOF

(71) Applicant: NESTEC S.A., Vevey (CH)

(72) Inventors: Arnaud Gerbaulet, Oye et Pallet (FR); Patrik Benz, Morschwil (CH)

(73) Assignee: Societe des Produits Nestle S.A., Vevey (CH)

( * ) Notice: Subject to any disclaimer, the term of this patent is extended or adjusted under 35 U.S.C. 154(b) by 229 days.

(21) Appl. No.: 16/313,557

(22) PCT Filed: Jun. 16, 2017

(86) PCT No.: PCT/EP2017/064733
§ 371 (c)(1),
(2) Date: Dec. 27, 2018

(87) PCT Pub. No.: WO2018/007124
PCT Pub. Date: Jan. 11, 2018

(65) Prior Publication Data
US 2019/0225411 A1 Jul. 25, 2019

(30) Foreign Application Priority Data
Jul. 4, 2016 (EP) ..................................... 16177735

(51) Int. Cl.
*B65D 85/804* (2006.01)
*B32B 27/32* (2006.01)
(Continued)

(52) U.S. Cl.
CPC ............ *B65D 85/8043* (2013.01); *B32B 1/02* (2013.01); *B32B 7/12* (2013.01); *B32B 15/08* (2013.01); *B32B 15/20* (2013.01); *B32B 27/306* (2013.01); *B32B 27/32* (2013.01); *B32B 27/34* (2013.01); *B32B 27/36* (2013.01);
(Continued)

(58) Field of Classification Search
CPC ..... B65D 85/8043; B32B 27/32; B32B 27/36; B32B 1/02; B32B 15/20; B32B 7/12; B32B 27/34; B32B 15/08; B32B 27/306; B32B 2307/7265; B32B 2307/7242;
(Continued)

(56) References Cited

U.S. PATENT DOCUMENTS 6,436,547 B1   8/2002   Toft et al.
2016/0137403 A1   5/2016   Heydel

FOREIGN PATENT DOCUMENTS

CN   103459142 A   12/2013
CN   204382736 U   6/2015
(Continued)

*Primary Examiner* — Michael C Miggins
(74) *Attorney, Agent, or Firm* — K&L Gates LLP

(57) ABSTRACT

Container (3) for producing of a beverage capsule containing a beverage ingredient, consisting of a formed laminated structure comprising a cup portion (3) with a depth-to-width ratio of at least 0.3 and a peripheral flange (4); said laminated structure comprising an aluminium foil (9) as a middle layer and comprising on the inner side of the aluminium foil (9) a sealing layer (10, 16); wherein the laminated structure further comprises at least one outer polymer film (13) laminated on the outer side of the aluminium foil (9) using a laminating adhesive layer (15) and in that the outer polymer film (13) is printed at its inner surface and is made of semi-crystalline polymer.

13 Claims, 4 Drawing Sheets

(51) Int. Cl.
| | | |
|---|---|---|
| *B32B 27/36* | (2006.01) | |
| *B32B 1/02* | (2006.01) | |
| *B32B 15/20* | (2006.01) | |
| *B32B 7/12* | (2006.01) | |
| *B32B 27/34* | (2006.01) | |
| *B32B 15/08* | (2006.01) | |
| *B32B 27/30* | (2006.01) | |

(52) U.S. Cl.
  CPC ....... *B32B 2255/06* (2013.01); *B32B 2255/26* (2013.01); *B32B 2307/4023* (2013.01); *B32B 2307/54* (2013.01); *B32B 2307/7242* (2013.01); *B32B 2307/7265* (2013.01); *B32B 2439/40* (2013.01)

(58) Field of Classification Search
  CPC ............ B32B 2307/54; B32B 2255/06; B32B 2255/26; B32B 2307/4023; B32B 2439/40
  See application file for complete search history.

(56) References Cited

FOREIGN PATENT DOCUMENTS

| | | |
|---|---|---|
| EP | 1541340 | 6/2005 |
| EP | 2489506 | 8/2012 |
| GB | 1523244 A | 8/1978 |
| WO | 2014161653 | 10/2014 |
| WO | 2015177591 | 11/2015 |
| WO | 2016030887 | 3/2016 |

CONTAINER FOR PRODUCING A BEVERAGE CAPSULE AND CAPSULE THEREOF

CROSS REFERENCE TO RELATED APPLICATIONS

The present application is a National Stage of International Application No. PCT/EP2017/064733, filed on Jun. 16, 2017, which claims priority to European Application No. 16177735.4, filed on Jul. 4, 2016, the entire contents of which are being incorporated herein by reference.

FIELD OF THE INVENTION

The invention relates to the field of beverage capsules utilized for preparing a beverage such as brewed coffee or tea in a beverage production machine. The invention more particularly relates to the container of the capsule which provides a storage and brewing volume for the beverage substance such as roast and ground coffee or leaf tea.

BACKGROUND

In the field of in-home or out-of-home beverage preparation, the use of capsules with pre-dosed beverage ingredients has gained a very high popularity due to the convenience of preparation and the constant quality of the delivered beverages. The beverage quality highly depends on the control of the value chain including: harvesting of the plants, leaves or beans (coffee, tea, etc.), post treatment of beans (roasting, grinding, etc.), manufacturing of the capsule (filling and sealing e.g. under controlled atmosphere), selection of the capsule packaging for protecting the beverage ingredients (e.g. against light, oxygen, humidity) and the conditions of extraction or infusion in the beverage machine.

Considering the capsule packaging, a favorite material still remains aluminium thanks to its ability to create a full barrier to light, humidity and oxygen, its forming capacity, its predictable opening (e.g, water injection and/or extraction), its pressure resistance, its appealing appearance, its recyclability and competitive manufacturing costs. Capsule manufacturers have also marketed capsules made of polymer(s) but none of them provide all the advantages of the aluminium ones. Just to mention a few disadvantages, polymer-based capsules provide a lower and shorter protection to oxygen, they are more difficult to pierce for water injection in the capsule and some of them are neither recyclable nor home compostable.

The outer surface of capsules for preparing brewed coffee or tea is preferably coloured or has a printing. Because the outer side of those capsule can be fluidly associated to the hot water supply or be in contact with the brewed beverage, the colour or printing ink has to be suitable for direct food contact and has to comply with the corresponding regulations. Regular packaging ink do not comply with said regulations and consequently direct contact of those inks with the hot water supply must be avoided..

Moreover, the aluminium container for such capsules must be deep enough to provide a sufficient volume for storing the beverage ingredients. In particular, the depth-to-width ratio of the container is usually relatively high thereby forcing the container to endure high stress that may cause defects on the decorative surface like cracks and/or plies. Capsules can be coated with a lacquer on the outside such as with a coloured epoxy or polyester lacquer. The lacquer is relatively viscous thereby making them non-suitable for delivering a precise or thin printed motif. Therefore, only a coarse printing definition is generally made possible by this way. GB1523244 relates to a drawn container made from a metal/plastic composite material composed of a metal layer lined with a plastic film only on its surface presented to the interior of the container, the metal layer having a thickness in the range of 0.04 to 0.3 mm and the plastics film being bi-axially oriented and having a thickness in the range 0.0008 to 0.025 mm. Printed matter can be provided on the outer surface of the container and may eventually be protected by a varnish such as epoxy. The varnish may be impregnated with dyes but is coated or sprayed in liquid form on the container and therefore cannot be printed with very precise motifs of one, two or a series of ink layers. In addition, dye can contact food at the external surface of the varnish and migrate to its external surface. Varnish may also contain undesired chemicals for food contact.

U.S. Pat. No. 7,968,163B2 relates to a resin-coated aluminium seamless can which is formed by draw-ironing and/or stretch-drawing, featuring superior resistance against cracks in the can wall during distribution and resistance against flange cracking. Again, printing of the can is obtained by coated ink and a finishing varnish which is hardened and dried.

JP2006176689A relates to a coating capable of forming a film by preventing bisphenol-A from eluting out of the film and to a coating composition especially suitable as the coating for an inner face of a can or an outer face of a can. The method for printing the aluminum can comprise printing the outer face of the aluminium can with the coating and then curing the coating at 150-201° C. for 20 to 45 seconds.

Therefore, there is a need for a solution for a deep-drawn sealable aluminium-based printed container for a beverage capsule which does not exhibit cracks and complies with the regulations in matter of direct contact with food.

SUMMARY OF THE INVENTION

The invention generally relates to a container for producing of a beverage capsule containing a beverage ingredient, consisting of a formed laminated structure comprising a cup portion with a depth-to-width ratio of at least 0.3 and a peripheral flange. The laminated structure comprises an aluminium foil as a middle layer and comprises on the inner side of the aluminium foil a sealing layer. The laminated structure further comprises at least one outer polymer film laminated on the outer side of the aluminium foil using a laminating adhesive layer. The outer polymer film is printed at its inner surface. The outer polymer film is made of semi-crystalline polymer. Preferably, the outer polymer film is made of a polymer having a degree of crystallization between 20 and 70%. More preferably, the degree of crystallization of the material of the film is between 20 and 40%, most preferably between 23 and 30%.

The degree of crystallization defines the amount of crystallized polymers in respect of the total amount of polymers. The degree of crystallization is measured by differential scanning calorimetry (DSC) according to DIN EN ISO 11357-3:2013-4. The glass transition temperature $T_g$ and the melting temperature $T_m$ of a semi-crystalline, 25 μm thick PET film have been determined by DSC, wherein $T_g$ is 74° C. and $T_m$ is 249° C. for a PET film having a degree of crystallization of 26.7%. The crystal size is typically in the order of 10 to 20 nm.

The outer polymer film has preferably a Young's modulus of 2000 MPa to 2700 MPa. Preferably, the Young's modulus of the outer polymer film is between 2100 MPa and 2300 MPa.

The outer polymer film is made of a material that is deep drawable into the cup-shaped structure without forming visible cracks. Preferably, the outer polymer film has a stress at break between 40 and 55 MPa.

Preferably, the cup portion of the formed structure has a depth-to-width ratio between 0.5 and 1.2. The structure is preferably deep drawn from a flat laminate.

The inner sealable film is configured to be protective against direct aluminium contact with food and also provides the ability for the container to be sealed to a foil or lid for closing the container, after its filling with beverage ingredient, for the production of the capsule.

As defined in the present application, the outer polymer film is functionally barrier to ink to prevent migration of ink outside of the outer film (i.e., at the outside surface of the outer film). The ink barrier of the film is arranged to comply with the European regulation EC10/2011 on "plastic materials and articles intended to come into contact with food". This regulation provides the acceptable limits of functional barrier, the plastics and elements should comply with. The term "ink" refers to any preparations used for printing or marking and/or compound(s) entering into the composition of the ink, e.g., mixtures which may be manufactured from combinations of colorants (pigments, dyes), binders, plasticisers, solvents, driers and other additives. Preferably, the polymer film outside the printed area(s) is translucid to let pass at least 95% of incident light.

The outer polymer film may be formed of a single polymer layer or two or more layers made of different polymer materials. The polymer material is preferably non-oriented to reduce the risk of cracks during forming.

The outer polymer film preferably comprises or consists of semi-crystalline polyethylene terephthalate (PET), polyamide (PA), polypropylene (PP) of combination thereof.

More preferably, the outer polymer film comprises or consist of non-oriented cast PET, non-oriented PA, non-oriented PP, non-oriented PA-EVOH, PP-EVOH or combinations thereof. Most preferably, the outer polymer film has a mean thickness of 10 to 50 μm, preferably of 15 to 30 μm. Within this range of thickness, the outer polymer film provides an effective barrier against the migration of ink. It also provides a good protection of the ink printing against mechanical aggression such as scratching or abrasion during stacking of the container, storage and transport.

The outer polymer film can be adhesively sealed onto the aluminum foil using a laminating adhesive layer. The laminating adhesive layer has preferably a mean thickness of 1 to 5 μm. The laminating adhesive layer has preferably a mass per square meter of 3 g/m² to 8 g/m². The adhesive layer can be made of a mixture or combination of different adhesives. Preferably, the laminating adhesive layer is made of a solvent-based adhesive or a mixture of such adhesives, such as aliphatic polyurethane-based adhesive(s).

The aluminium foil is preferably a soft annealed aluminum foil having a mean thickness of 50 to 250 μm, preferably 80 to 120 μm. The foil provides the rigidity and formability to the container and a barrier to gas. The aluminium foil is self-standing in the sense that it can be conferred a defined shape upon forming. When roast and ground coffee is the main beverage ingredient, aluminium protects coffee against oxidation with ambient atmosphere and prevents the carbon gas of coffee from escaping out of the sealed capsule. Aluminium is preferably an alloy of aluminium having a tensile strength of from 100 to 160 N/mm² and an elongation A100 of from 15 to 30%. A most preferred grade of aluminium is AA8011A alloy.

The inner sealing film or layer adhesively sealed onto the inner surface of the aluminium foil can be made of one polymer layer or two or more polymer layers. The inner sealing film is preferably selected from the group consisting of: polyethylene (PE), polypropylene (PP), a heat seal lacquer and combinations thereof.

In one mode, the inner sealing layer consists of a heat seal lacquer preferably having a mass per square meter of 5 to 15 g/m², more preferably 8 to 12 g/m².

In another mode, the inner sealing film consists of a polypropylene (PP) or polyethylene (PE) film glued to the aluminium foil by an intermediate laminating adhesive layer. The PP or PE film has preferably a thickness of 25 to 35 μm, more preferably 28 to 32 μm. The laminating adhesive layer preferably has a mass per square meter of 3 g/m² to 8 g/m², more preferably 4.5 g/m² to 6 g/m². The selection of the inner sealing film or layer can depend on the sealing compatibility of the film or layer with, one side, the middle aluminium foil of the container structure and, on the other side, the material of the closing foil for sealing with the closing foil when assembling the capsule.

According to an aspect of the invention, the outer polymer film of the laminated structure of the container is reverse printed at its inner surface. The outer polymer film preferably comprises an ink layer. The outer polymer film and the ink layer constitute together a reverse printed polymer layer. The printed on the surface with ink can be carried out by rotogravure or digital printing. The advantage is that a very precise printing of pattern by colour dots is made possible. Ink of different colours (including back and white) can be applied as superimposed and/or side-by-side sub-layers to produce the pattern. Each ink sub-layer is preferably constituted of multiple ink dots. Preferably, the ink layer or sub-layers has a dot size comprised of 20 μm to 80 μm, more preferably of 20 μm to 60 μm. This dot definition enables to produce very sharp and contrasted patterns and/or lettering.

The invention further relates to a capsule for the preparation of a beverage comprising a container as aforementioned, wherein the container contains a beverage substance and wherein it is closed by a closing foil which is sealed onto the peripheral flange of the container.

The closing foil of the capsule which is sealed against the formed laminated structure of the container for providing a closed capsule can consist of an aluminium foil. In this embodiment, the inner sealing layer of the laminated structure of the container consists of a heat seal lacquer. Alternatively, it is a laminate of aluminium and and a heat seal lacquer. The heat seal lacquer is used for sealing the foil to the inner sealing film, in particular, to the PP or PE film, or to a heat seal lacquer of the inner sealing film of the laminated structure of the container. Alternatively, the closing foil is a laminate of Aluminium-PP or a laminate of Aluminium-PE. In all these modes, the aluminium foil has preferably a flat thickness between 20 and 120 μm, preferably of 30 to 40 μm. Alternatively, the closing foil is aluminium-free and consists of a multi-layer polymer comprising a gas barrier polymer between two layers made of polyolefin. Preferably, the closing foil consists of PP-EVOH-PP or PP-EVOH-PE or PE-EVOH-PE. In this embodiment, the inner sealing layer of the laminated structure of the container consists of a heat seal lacquer.

The closing foil can be designed to be torn against an extraction plate of the beverage production machine and by the pressure of beverage applied against the closing foil. The thickness of the foil and/or the choice of polymer is determined to provide the desired opening function. The closing foil can thereby tear, puncture and/or cut open by creating one orifice or a plurality of small orifices, to allow beverage to be extracted from the capsule and/or to allow liquid (e.g. water) to be supplied inside the capsule. The closing foil can also be formed of a foil with pre-made openings (e.g., beverage outlets and/or liquid inlets). In such case, the foil is preferably at least partially covered by a second foil covering these pre-made openings. The invention further relates to a method for producing a container for the production of a beverage capsule, as aforementioned, wherein it comprises the steps of:
  providing a deep-drawable packaging film comprising:
    an aluminium foil (9) as a middle layer,
    a sealing layer (10, 16) on the inner side of the aluminium foil (9),
    at least one outer polymer film (13) laminated on the outer side of the aluminium foil (9) using a laminating adhesive layer (15),
    wherein the outer polymer film (13) is printed at its inner surface and is made of semi-crystalline polymer and,
  forming the packaging film to a cup portion (3) with a depth-to-width ratio of at least 0.3 and forming it with a peripheral flange (4).

Preferably, the deep-drawable packaging film is provided with an outer polymer film made of a semi-crystalline material having a degree of crystallization between 20 to 70%, respectively preferably between 20 and 40% and having a Young's modulus of 2000 MPa to 2700 MPa, respectively preferably between 2100 MPa and 2300 MPa. Most preferably, the degree of crystallization is between 23 and 30%.

The deep-drawable packaging film not only sustains a certain extension ratio but also allows sustaining a forming process, especially a deep drawing process without forming cracks in the polymer film. For this reason, the packaging film has a stress at break of 40 and 55 MPa. The extension ratio is the ratio between the final length of a film strip and its initial length. The deep-drawable packaging film has preferably an extension ratio of at least 1.6, preferably comprised between 1.6 and 5. The extension ratio is the ratio between the final length of the film strip and its initial length.

The outer polymer film is a functional barrier layer preventing the migration of ink particles or its components to the outer free surface of the polymer film, i.e. the surface of the semi-crystalline polymer film lying opposite to the aluminium foil.

As defined in the present application, the outer polymer film acts as a functional barrier to ink according to the definition of functional barrier documented in Regulation EU No. 10/2011 and its amendments "plastic materials and articles intended to come into contact with food". The Regulation defines a functional barrier as a layer, of any type of material, within food contact materials or articles preventing the migration of substances from behind that barrier into the food and rendering the final article in compliance with Article 3 io of Regulation (EC) n. 1935/2004 "on materials and articles intended to come into contact with food".

Preferably, the step of forming the cup portion is produced by deep drawing of the deep-drawable packaging film in one or more shots. More preferably, the step of deep drawings is obtained in two or three deep drawing shots. The number of deep drawing shots depends on the depth-to-width ratio of the container to be obtained. Generally, the higher the ratio, the higher the number of shots is.

The step of forming is preferably preceded by a step of laminating the aluminium foil with a reversed-printed outer film on one side and with the inner sealable film on the opposite side to form the flat packaging film. During the laminating step, the aluminium foil is preferably coated with adhesive layers on each of its two sides. After laminating or coating, the adhesive layers are cured to become solid.

DETAILED DESCRIPTION OF THE DRAWINGS

Figure 1:
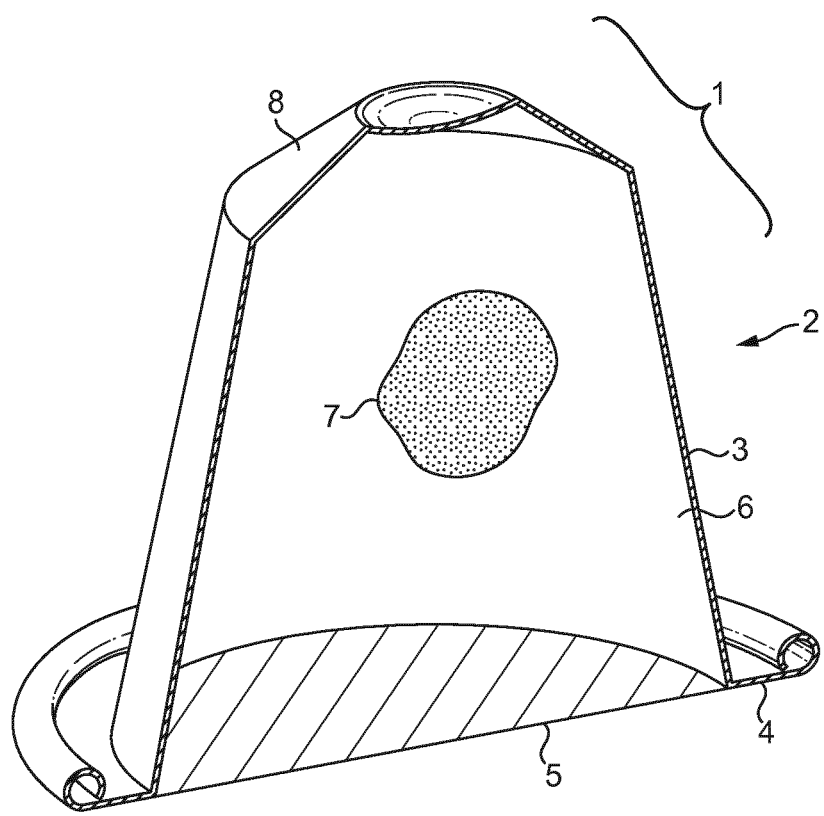
FIG. 1 shows a cross-sectional perspective view of a capsule including a container according to the invention.

FIG. 1 illustrates an example of capsule 1 of the invention. The capsule comprises a container 2 comprising a cup portion 3 and a flange portion 4. The capsule further comprises a foil member 5 which is sealed, such as by heat welding, to the flange portion 4. The container defines an internal volume 6 containing a beverage substance 7 (only partially represented). The capsule is preferably impermeable to fluid, preferably to gas, by virtue of its constituting materials and the sealing of the container 2 with the foil member. The beverage substance can be an extractable substance such as roast and ground coffee or an infusion substance such as leaf tea, e.g. powder or fragments. The capsule is dimensioned and shaped to be inserted in a dedicated beverage production machine which comprises a capsule receiving chamber for receiving the capsule.

The machine generally comprises liquid (e.g. hot water) injection means to supply liquid in the capsule through the container and beverage extraction means to extract beverage from the foil member. The liquid injection means can comprise blades and/or needles for perforating the bottom 8 of the container and at least one liquid conduit for supplying liquid in the capsule receiving chamber. As liquid enters in the chamber, it also progressively fills the capsule under pressure through the perforated orifices created by the blades and/or needles. When pressure of liquid reaches a sufficient level, the foil member 5 deforms and finally opens by creating orifice(s), e.g., by tearing, cutting or bursting. The opening, in particular the orifices, can be controlled by an extraction plate of the machine comprising multiple protrusions and channels. During extraction, the beverage flows through the substance and through the orifices of the foil member. This process of extraction and device is further described in EP0512470. The invention is however not limited to the production of containers or capsules exclusively intended for such process and device. The foil member 5 can be a pre-perforated foil with predefined liquid outlets or it can be a woven or non-woven filter or a paper filter or combinations thereof.

Figure 2:
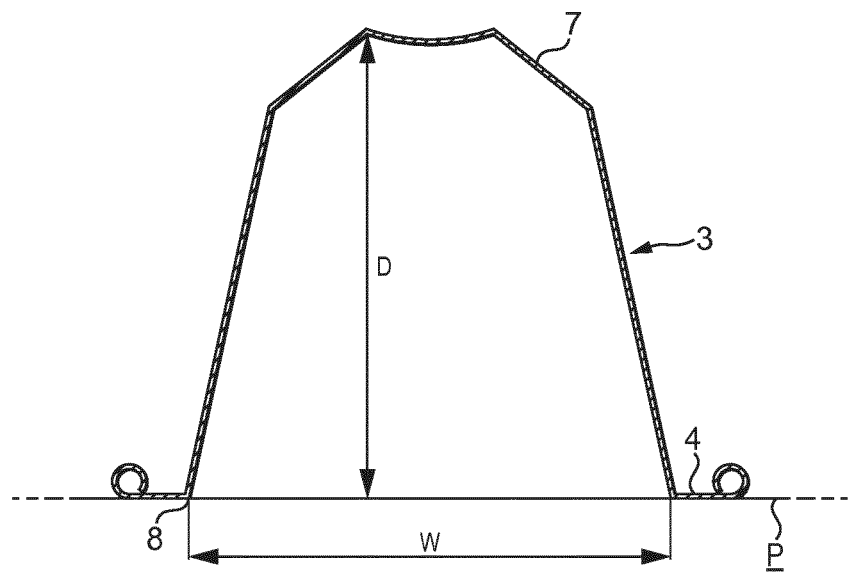
FIG. 2 shows a cross-sectional side view of a container of the invention.

In a general manner, the container 3 has preferably a depth-to-width ratio of at least 0.3, preferably at least 0.5, preferably at least 0.7. The depth-to-width ratio is preferably comprised between 0.8 and 1.2. As illustrated in FIG. 2, the depth (D) of the container is measured as the maximal internal length between the bottom 7 of the container (at its inner surface) and the plane (P) intersecting the inner circumferential line 8 between the flange 4 and the cup portion 3. The width (W) of the container is measured as the maximal dimension of the container which is perpendicular to the depth (D). In the illustrated example, the width (W) is measured as the maximal internal diameter of the cup portion at the circumferential line 8. It should be noted that the circumferential line 8 of the container between the flange 4 and the cup portion 3 could be a circle such as in the illustrated example or have a different shape such as a polygonal (e.g. octagonal), oval or other form.

Figure 3:
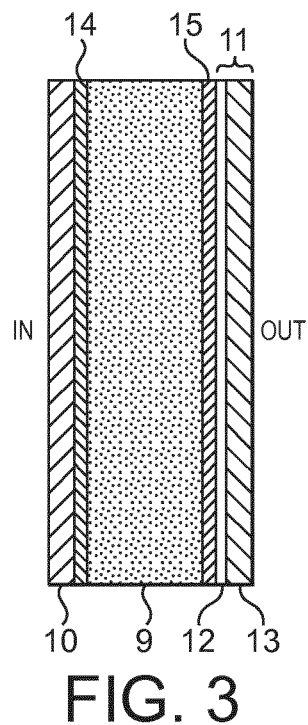
FIG. 3 shows a schematic cross section the packaging structure of the container according to a first embodiment of the invention.

FIG. 3 shows a first mode of the packaging structure of the container of the invention. The structure generally comprises an aluminium foil 9 an inner sealing layer or film 10 and an outer reverse printed film 11. The aluminium foil forms a middle layer of the laminate. The inner sealing layer 10 forms the layer in contact with the beverage ingredient. The outer reverse printed film 11 forms the external layer of the container. It should be noted that the structure could comprise one or more additional layers. Alternatively or additionally each film could comprise two or more layers.

The reverse printed film comprises a semi-crystalline polymer film 13 and an ink layer 12 printed at the inner surface of the polymer film 13. The reverse printed film 11 is laminated to the aluminium foil using a laminating adhesive layer 15. The laminating adhesive layer can be made of polyurethane. The reverse printed film 11 may comprise one layer or several polymer layers; one of which is at least a barrier to prevent the migration of ink of the ink layer 12 to the outer, free surface of the outer polymer film 13. In this mode, the polymer film 13 comprises a single polymer layer. Preferably, the polymer film 13 is non-oriented cast PET. Preferably, the polymer film 13 has a thickness of at least 10 microns, preferably of 20 to 40 microns such that it can provide an efficient barrier to ink migration during storage (i.e., in ambient air) as well as during the preparation of the beverage in the device. The hot beverage preparation conditions are generally hot water within a range of 90 to 95° C. and possibly high pressure from 4 to 15 bars, during a short time of between 10 and 120 seconds. The ink layer may be applied as one or several layers of ink dots of same or different colours. The ink dots have a preferred size of 20 to 80 μm, in particular 20 to 60 μm. The other side of the aluminium foil 9 opposite to the reverse printed polymer film comprises an inner sealing layer or sealing film 10. The sealing layer or film 10 is laminated by a laminating adhesive film 14. Preferably, the inner sealing layer is made of polypropylene. The laminating adhesive layer can be made of polyurethane.

Figure 4:
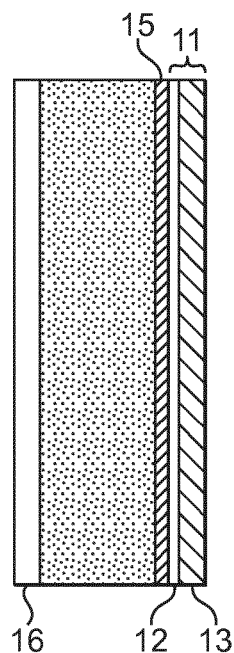
FIG. 4 shows a schematic cross section the packaging structure of the container according to a second embodiment of the invention.

FIG. 4 shows a second mode of the printed structure of the container of the invention. The packaging structure comprises an aluminium foil 9 as a middle layer or core layer. A reverse printed film 11 is laminated on the outer side of the aluminium foil using a laminating adhesive layer 15. The reverse printed polymer film 11 consists again of a semi-crystalline polymer film 13 and an ink layer 12, wherein the polymer film 13 acts as a barrier layer that prevents migration of ink to the outer, free surface of the polymer film 13. The ink layer 12 forms the interface between the semi-crystalline polymer film 13 and the laminating adhesive layer 15. In contrast to the previous embodiment, the other side of the aluminium foil opposite to the reverse printed polymer film 11 is coated by a layer of a heat seal lacquer 16, wherein preferably no adhesion layer is applied, i.e., the heat seal lacquer is directly applied to the one aluminium surface.

Figure 5:
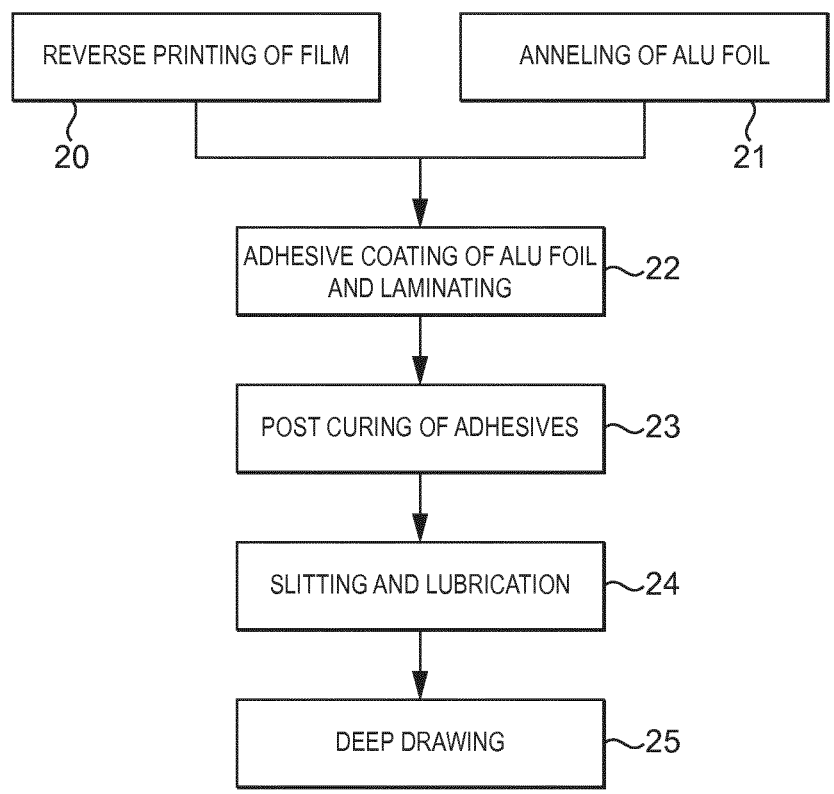
FIG. 5 is a flow chart of the method of manufacturing the container of the invention.
Figure 6:
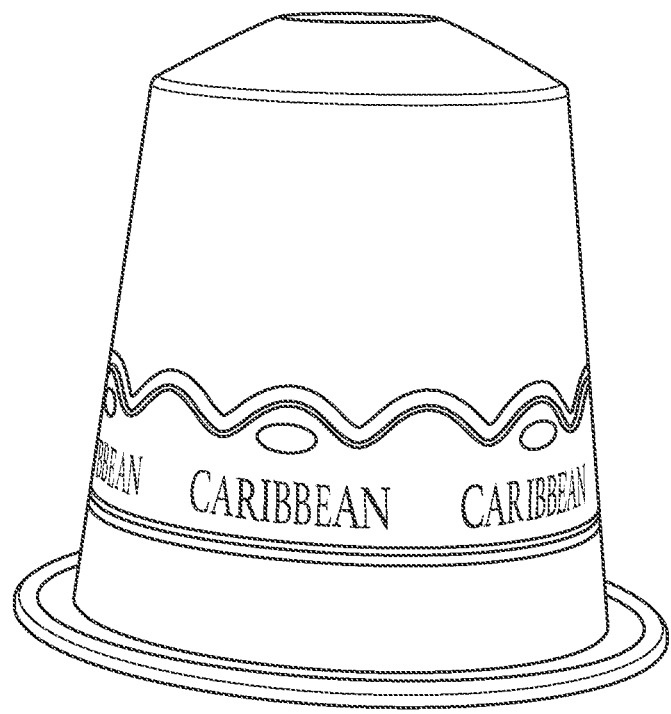
FIG. 6 shows a picture of a first example of container of the invention with printing.
Figure 7:
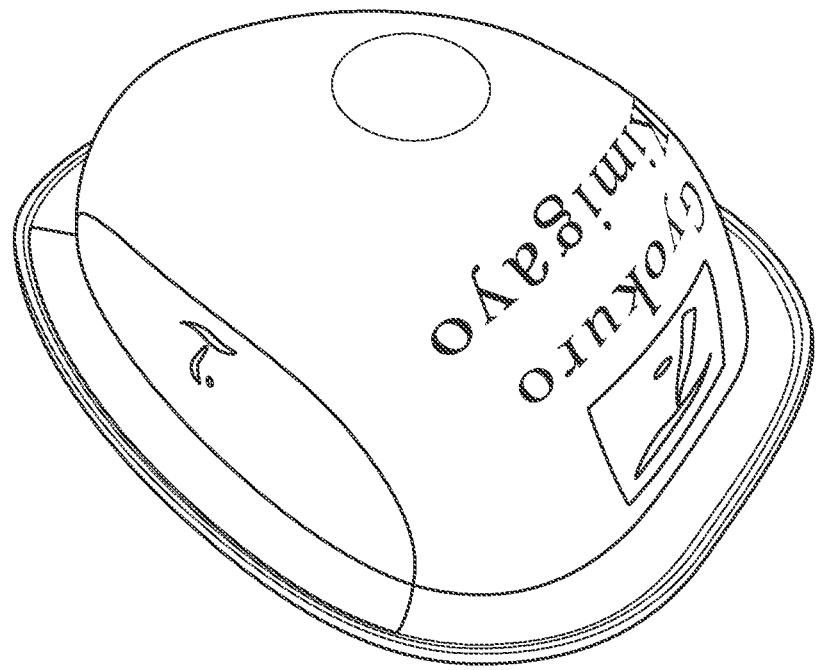
FIG. 7 shows a picture of a second example of container of the invention with printing.

FIG. 5 illustrates the main steps for producing the container of the invention from a deep-drawable packaging film.

As a preliminary step 20, the outer film is printed by any suitable technique. Preferably, the film is printed by rotogravure because this technique provides a printing of very high definition. Other alternative printing techniques can be flexography, silk screen printing or digital printing. The reverse printing of the deep-drawable packaging film or flat laminate has preferably a distortion corrected relative to an intended subsequent forming process.

In still a preliminary step 21, a foil of aluminium is submitted to a heat treatment, in particular annealing, to provide the final mechanical and physical characteristics to the foil. Such treatment is usually necessary to confer the deep forming ability to the foil.

In a next step 22, the aluminium foil is coated with an adhesive on each of its sides. In the same step, the reverse-printed outer film 11 obtained in step 20 and an inner sealable film 10 are laminated with the aluminium foil by the adhesives. Lamination of the film and adhesives with the aluminium foil can preferably be obtained in a single step. Of course, two or more lamination steps could be envisaged but it makes the method more complex with no particular advantage. In an optional step 23, the adhesives are cured, in particular, when polyurethane is used as adhesives.

In an alternative mode, the aluminium foil is laminated with the outer polymer layer and then its inner surface is coated with a heat seal lacquer.

In the next step 24, the laminate is usually cut into several bands in a slitting machine and the bands lubricated before the forming step.

Finally, in the next step 25, the containers of the invention are formed by deep-drawing in one or several shots in the laminated bands.

EXAMPLE

Migration Test

Reverse printed bodies of capsules of the invention were submitted to a migration test according to European Regulation (EU) 10/2011. The tested body of capsule were formed at the shape and dimension of a Nespresso® body of capsule from a flat comprising reverse printed PET-adhesive-aluminium-sealing lacquer. The PET had a mean thickness of 10 microns, the aluminium foil had a mean thickness of 90 microns and the sealing lacquer had a mass per square meter of 8 grams.

The external side (i.e. PET) was exposed to 3% acetic acid for 2 hours at 70° C. and for the specific migration to 20% ethanol for 2 hours at 70° C. for 5 minutes at 100° C. The overall migration was performed according to EN 1186. After concentrating the 20% ethanol migration solutions (factor 10), a mix of internal standards was added (IS 1: 10 ppb D4-DBP; IS 2: 100 ppb D4-BBP, IS 3: 10 ppb 2-ethylhexyl diphenyl phosphate and IS 4: 100 ppb D4-DnNP) and the migration solutions were analysed using the GC-MS screening procedure for ingredients and contaminants. The detected migrants were compared with the MS database NIST and calculated with the 100 ppb internal standards.

The overall migration value obtained with the tested simulant is below the limit of 10±3 mg/dm$^2$ according to the Commission Regulation (EU) No 10/2011 and the Swiss Regulation on Food Contact Materials.

GC-MS-Screening: 2 h After subtracting the blank, no substances of significant concentration >10 ppb (=0.01 mg/kg food) were detected by GC-MS.

GC-MS-Screening: 5 min After subtracting the blank, no substances of significant concentration >10 ppb (=0.01 mg/kg food) were detected by GC-MS.

The specific migration value [mg substance/kg food] was calculated assuming a cubic packaging with an area of 6 dm2 that is in contact with 1 kg of food. For any other surface-area-to-volume ratio, the resulting specific migration value is different.

The invention claimed is:

1. A capsule for preparation of a beverage in a beverage production device, the capsule comprising a container comprising a formed laminated structure comprising a cup portion with a depth-to-width ratio of at least 0.3 and a peripheral flange, the laminated structure comprising an aluminium foil as a middle layer and comprising on the inner side of the aluminium foil a sealing layer, the laminated structure further comprises at least one outer polymer film laminated on the outer side of the aluminium foil using a laminating adhesive layer and the outer polymer film is printed at its inner surface and is made of semi-crystalline polymer, wherein the container contains a beverage substance and wherein the container is closed by a closing foil which is sealed onto the peripheral flange of the container.

2. The capsule according to claim 1, wherein the outer polymer film is made of semi-crystalline polymer having a degree of crystallization between 20 and 70% and having a Young's modulus of 2000 MPa to 2700 MPa.

3. The capsule according to claim 1, wherein the outer polymer film has a stress at break of between 40 and 55 MPa.

4. The capsule according to claim 1, wherein the outer polymer film has mean thickness of 10 to 50 μm.

5. The capsule according to claim 1, wherein the aluminium foil is a soft annealed aluminum foil made of AA8011A alloy having a mean thickness of 50 to 250 microns.

6. The capsule according to claim 1, wherein the inner sealing layer consists of a heat seal lacquer having a mass per square meter of 5 to 15 g/m2.

7. The capsule according to claim 1, wherein the laminating adhesive layer has a mass per square meter of 3 g/m2 to 8 g/m2.

8. The capsule according to claim 1, wherein the outer polymer film comprises a material selected from the group consisting of semi-crystalline polyethylene terephthalate, polyamide, polypropylene and combinations thereof.

9. The capsule according to claim 8, wherein the outer polymer film comprises a material selected from the group consisting of non-oriented cast PET, non-oriented PA, non-oriented PP, non-oriented PA-EVOH, PP-EVOH and combinations thereof.

10. The capsule according to claim 1, wherein the outer polymer film comprises an ink layer printed on the inner surface such as by rotogravure or digital printing.

11. The capsule according to claim 10, wherein the ink layer is formed of ink dots.

12. The capsule according to claim 1, wherein the sealing inner layer consists of a polypropylene film glued to the aluminium foil by an intermediate laminating adhesive layer.

13. The capsule according to claim 12, wherein the polypropylene film has a thickness of 25 μm to 35 μm.

* * * * *